United States Patent
Handa et al.

(10) Patent No.: US 9,755,528 B2
(45) Date of Patent: Sep. 5, 2017

(54) AC-DC CONVERTER WITH OUTPUT POWER SUPPRESSION

(71) Applicant: DENSO CORPORATION, Kariya, Aichi-pref. (JP)

(72) Inventors: Yuuichi Handa, Anjo (JP); Seiji Iyasu, Anjo (JP); Kimikazu Nakamura, Handa (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 15/390,763

(22) Filed: Dec. 27, 2016

(65) Prior Publication Data
US 2017/0110972 A1    Apr. 20, 2017

Related U.S. Application Data

(62) Division of application No. 14/667,894, filed on Mar. 25, 2015.

(30) Foreign Application Priority Data

Mar. 28, 2014    (JP) .................................. 2014-068627

(51) Int. Cl.
G05F 5/00    (2006.01)
H02M 3/335    (2006.01)
H02M 1/32    (2007.01)

(52) U.S. Cl.
CPC ......... H02M 3/33507 (2013.01); H02M 1/32 (2013.01)

(58) Field of Classification Search
CPC .......... H02M 7/02; H02M 7/04; H02M 7/046; H02M 7/06; H02M 7/062; H02M 7/066;
(Continued)

(56) References Cited

U.S. PATENT DOCUMENTS 5,977,530 A    11/1999    Bessho
2004/0165868 A1    8/2004    Sato et al.
(Continued)

FOREIGN PATENT DOCUMENTS

| JP | 2006-129619 | 5/2006 |
|---|---|---|
| JP | 2006-187085 | 7/2006 |
| JP | 3797361 | 7/2006 |

OTHER PUBLICATIONS

Office Action (2 pages) dated Feb. 16, 2016, issued in corresponding Japanese Application No. 2014-068627 and English translation (2 pages).

(Continued)

*Primary Examiner* — Alex Torres-Rivera
(74) *Attorney, Agent, or Firm* — Nixon & Vanderhye P.C.

(57) ABSTRACT

A power conversion apparatus for converting AC power supplied from an AC power source to DC power includes an AC-DC conversion circuit connected with the AC power source at an input end thereof for converting the AC power to DC power, a DC-DC conversion circuit connected with an output end of the AC-DC conversion circuit at an input end thereof for converting DC voltage level of the DC power generated by the AC-DC conversion circuit, a smoothing capacitor parallel connected to the output end of the AC-DC conversion circuit and the input end of the DC-DC conversion circuit, a DC link voltage detector for detecting a voltage of the smoothing capacitor as a DC link voltage, and a control unit for controlling operation of the DC-DC conversion circuit. The control unit suppresses an output power of the DC-DC conversion circuit, if the DC link voltage is smaller than a predetermined value.

1 Claim, 7 Drawing Sheets

(58) Field of Classification Search
CPC .......... H02M 7/10; H02M 7/12; H02M 7/103;
H02M 7/106; H02M 7/125; H02M 7/155;
H02M 7/1555; H02M 7/1557; H02M
7/19; H02M 7/21; H02M 7/213; H02M
7/217; H02H 7/1255
USPC ........ 363/44, 45, 46, 52, 53, 54, 61, 65, 76,
363/77, 81, 84, 86, 87, 88, 114
See application file for complete search history.

(56) References Cited

U.S. PATENT DOCUMENTS

| | | |
|---|---|---|
| 2006/0056210 A1 | 3/2006 | Yamada |
| 2006/0108986 A1 | 5/2006 | Funabashi et al. |
| 2011/0273130 A1* | 11/2011 | Lee .................... H01M 10/465 320/101 |
| 2014/0340097 A1* | 11/2014 | Choi ........................ H02H 3/28 324/543 |
| 2015/0280591 A1 | 10/2015 | Handa |

OTHER PUBLICATIONS

Handa, Office Action dated Oct. 20, 2016 issued in U.S. Appl. No. 14/667,894, filed Mar. 25, 2015 (13 pages).

* cited by examiner

AC-DC CONVERTER WITH OUTPUT POWER SUPPRESSION

CROSS REFERENCE TO RELATED APPLICATIONS

The present application is a Division of application Ser. No. 14/667,894, filed Mar. 25, 2015 and claims priority to Japanese Patent Application No. 2014-68627 filed on Mar. 28, 2014, the entire contents of each of which are hereby incorporated by reference.

BACKGROUND OF THE INVENTION

1. Field of the Invention

The present invention relates to a power conversion apparatus for converting AC power supplied from an AC power source to DC power.

2. Description of Related Art

Japanese Patent Application Laid-open No. 2006-129619 describes a power conversion apparatus capable of preventing malfunctioning when the output current thereof is detected to have decreased under an environment where the output voltage of an AC power source varies greatly. This power conversion apparatus is configured to set a command value of the output current thereof below a predetermined value if the input voltage supplied from the AC power source is detected to be smaller than a predetermined value, to prevent the output current from being determined to have decreased below the command value to thereby prevent malfunctioning.

However, since the power conversion apparatus is configured to determine the command value of the output current based on the input voltage, a time necessary to make a determination whether the input voltage is smaller than the predetermined value may cause a problem. That is, since the input voltage is an AC voltage, and accordingly a peak value of the AC voltage has to be detected to determine the value of the input voltage, it may take a half-period of the AV voltage to make the determination at longest.

Furthermore, when the power conversion apparatus described in the above patent document is used for a system including an AC-DC converter and a DC-DC converter which are mounted on different units, communication devices for enabling communication between the AC-DC converter and the DC-DC converter are required. In this case, there may occur other problems such as degradation of responsiveness due to communication delay, increase in parts count due to mounting of communication equipment, or reliability degradation due to interposition of the communication devices.

SUMMARY

An exemplary embodiment provides a power conversion apparatus for converting AC power supplied from an AC power source to DC power, including:

an AC-DC conversion circuit connected with the AC power source at an input end thereof for converting the AC power to DC power;

a DC-DC conversion circuit connected with an output end of the AC-DC conversion circuit at an input end thereof for converting DC voltage level of the DC power generated by the AC-DC conversion circuit;

a smoothing capacitor parallel connected to the output end of the AC-DC conversion circuit and the input end of the DC-DC conversion circuit;

a DC link voltage detector for detecting a voltage of the smoothing capacitor as a DC link voltage; and a control unit for controlling operation of the DC-DC conversion circuit, wherein the control unit is configured to suppress output power of the DC-DC conversion circuit if the DC link voltage is smaller than a first predetermined value.

According to the exemplary embodiment, there is provided a power conversion apparatus capable of responding rapidly to voltage variation of an AC power source.

Other advantages and features of the invention will become apparent from the following description including the drawings and claims.

PREFERRED EMBODIMENTS OF THE INVENTION

In the below described embodiments, the same or equivalent sections or units are indicated by the same reference numerals or characters.

First Embodiment

Figure 1:
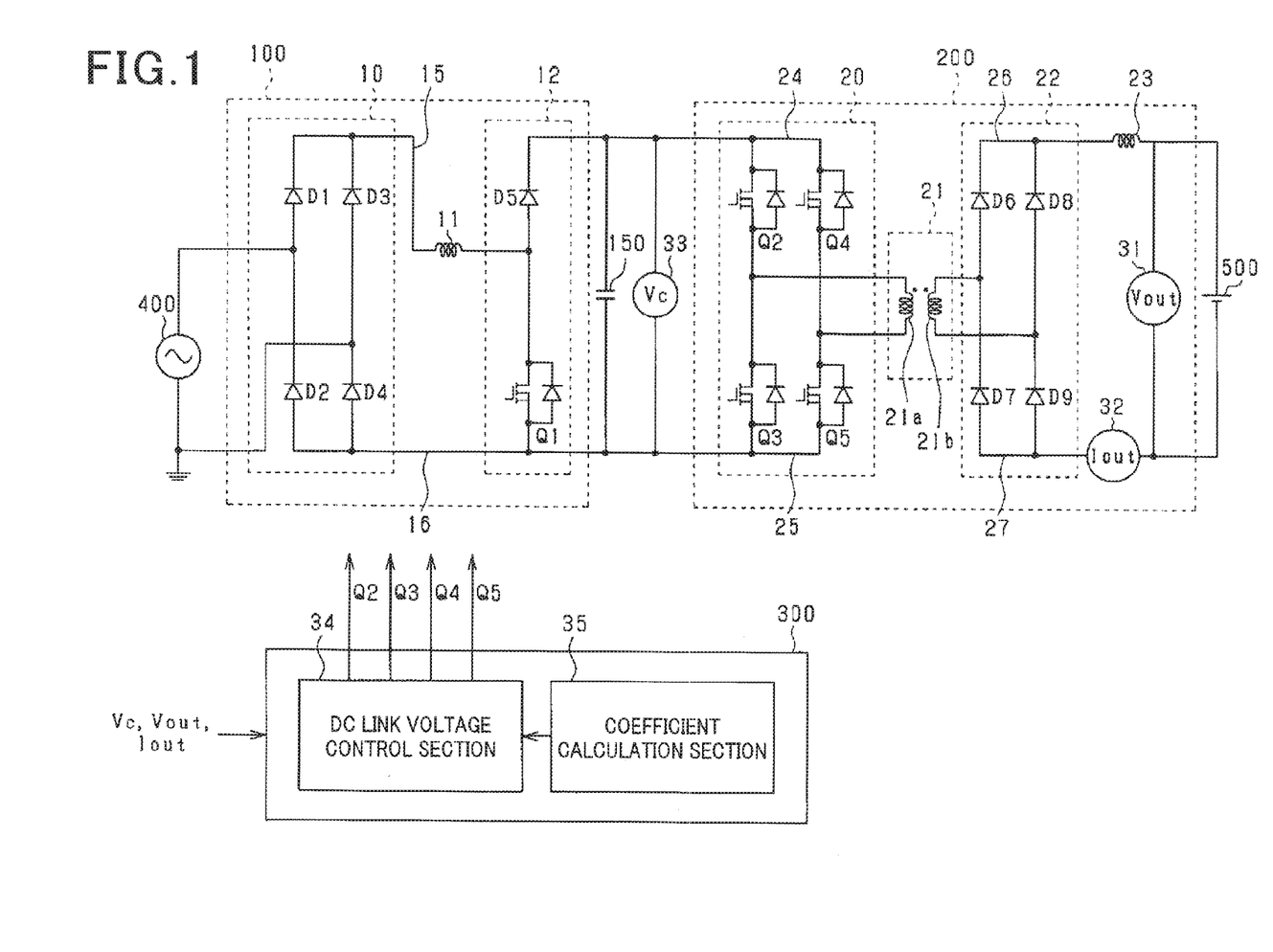
FIG. 1 is a circuit diagram of a power conversion apparatus according to a first embodiment of the invention.

FIG. 1 is a circuit diagram of a power conversion apparatus according to a first embodiment of the invention. This power conversion apparatus is used for supplying electric power to a rechargeable battery by converting AC power inputted from an AC power source such as a domestic power source or a commercial AC power source to DC power.

As shown in FIG. 1, the power conversion apparatus includes an AC-DC conversion circuit 100, a smoothing capacitor 150 parallel-connected to the AC-DC conversion circuit 100, a DC-DC conversion circuit 200, and a control unit 300. The AC-DC conversion circuit 100 is connected with an AC power source 400 at its input end, and connected with the input end of the DC-DC conversion circuit 200 at its output end. The output end of the DC-DC conversion circuit 200 is connected to a rechargeable battery 500.

The AC-DC conversion circuit 100 includes a diode bridge circuit 10, a first smoothing reactor 11 and a half-bridge circuit 12. The AC power source 400 is connected to the diode bridge circuit 10 through the input end of the AC-DC conversion circuit 100.

The diode bridge circuit 10 includes four diodes D1 to D4. The cathodes of the diode 1 and the diode 3 are connected to a first wire 15. The anode of the diode D1 is connected to a first end of the AC power source 400 and the cathode of the diode D2. The anode of the diode D3 is connected to a second end of the AC power source 400 and the cathode of the diode D4. The anode of the diode D2 and the anode of the diode D4 are connected to a second wire 16. The diode bridge circuit 10 and the half bridge circuit 12 are connected to each other by the first wire 15 and the second wire 16. The first wire 15 is provided with the first smoothing reactor 11 between the diode bridge circuit 10 and the half bridge circuit 12.

The half bridge circuit 12 includes a diode 5 and a switching element Q1 constituted of a MOSFET. The diode 5 is connected to the high voltage side output end of the AC-DC conversion circuit 100 at its cathode, and connected to the first wire 15 and the drain terminal of the switching element Q1 at its anode. The source terminal of the switching element Q1 is connected to the second wire 16. The second wire 16 is connected to the low voltage side output end of the AC-DC conversion circuit 100. The switching element Q1 includes a parasitic diode parallel-connected reversely.

The DC-DC conversion circuit 200 includes a bridge circuit 20, a transformer 21 constituted of a first coil 20 and a second coil 21b, a diode bridge circuit 22 and a second smoothing reactor 23.

The bridge circuit 20 includes switching elements Q2 and Q5 each constituted of a MOSFET. Each of the switching elements Q2 and Q4 is disposed in the upper arm on the high voltage side. Each of the switching elements Q3 and Q5 is disposed in the lower arm on the low voltage side. The switching element Q2 is connected to a high voltage side wire 24 at its drain terminal, and connected to the drain terminal of the switching element Q3 and one end of the first coil 21a at its source terminal. The switching element Q4 is connected to the high voltage side wire 24 at its drain terminal, and connected to the drain terminal of the switching element Q5 and the other end of the first coil 21a at its source terminal. The source terminals of the switching elements Q3 and Q5 are both connected to a low voltage side wire 25. The high voltage side wire 24 and the low voltage side wire 25 are connected to the high voltage side output end and the low voltage side output end of the AC-DC conversion circuit 100, respectively. Each of the switching elements Q2 to Q5 includes a parasitic diode parallel-connected reversely.

The diode bridge circuit 22 includes diodes D6 to D9. Each of the diodes D6 and D8 is disposed in the upper arm on the high voltage side. Each of the diodes D7 and D9 is disposed in the lower arm on the low voltage side. The diode D6 is connected to a high voltage side wire 26 at its cathode, and connected to the cathode of the diode D7 and one end of the second coil 21b at its anode. The diode D8 is connected to the high voltage side wire 26 at its cathode, and connected to the cathode of the diode D9 and the other end of the second coil 21b at its anode. The anodes of the diodes D7 and D9 are both connected to a low voltage side wire 27. The high voltage side wire 26 is connected to the positive electrode of the rechargeable battery 500 through the second smoothing reactor 23. The low voltage side wire 27 is connected to the negative electrode of the rechargeable battery 500 through the second smoothing reactor 23.

The power conversion apparatus of this embodiment further includes a first voltage detector 31, a current detector 32 and a second voltage detector 33 as a DC link voltage detecting means.

The first voltage detector 31 is parallel-connected to the output end of the DC-DC conversion circuit 200 to detect the output voltage Vout of the DC-DC conversion circuit 200. The current detector 32 is parallel-connected to the output end of the DC-DC conversion circuit 200 to detect the output current Iout of the DC-DC conversion circuit 200. The second voltage detector 33 is parallel-connected to the smoothing capacitor 150 to detect the DC link voltage which is a voltage outputted from the AC-DC conversion circuit 100 and applied to the smoothing capacitor 150.

The control unit 300 includes a DC link voltage control section 34 and a coefficient calculation section 35. The control unit 300 receives measurements of the output voltage Vout, the output current Iout and the DC link voltage Vc. The control unit 300 includes a memory in which a power command value Pout* is stored. The power command value Pout* commands the value of the output power Pout representing the power outputted from the output end of the DC-DC conversion circuit 200. The coefficient calculation section 35 calculates a coefficient k used for output power suppression control (control of the output power Pout), and sends it to the DC link voltage control section 34. The DC link voltage control section 34 calculates a PWM signal based the output voltage Vout, the output current Iout, the power command value Pout* and the coefficient k. The control unit 300 monitors the DC link voltage representing the value of the voltage applied to the DC-DC conversion circuit 200. The control unit 300 stops controlling upon detecting that the DC link voltage Vc has fallen below a predetermined stop voltage.

Figure 2:
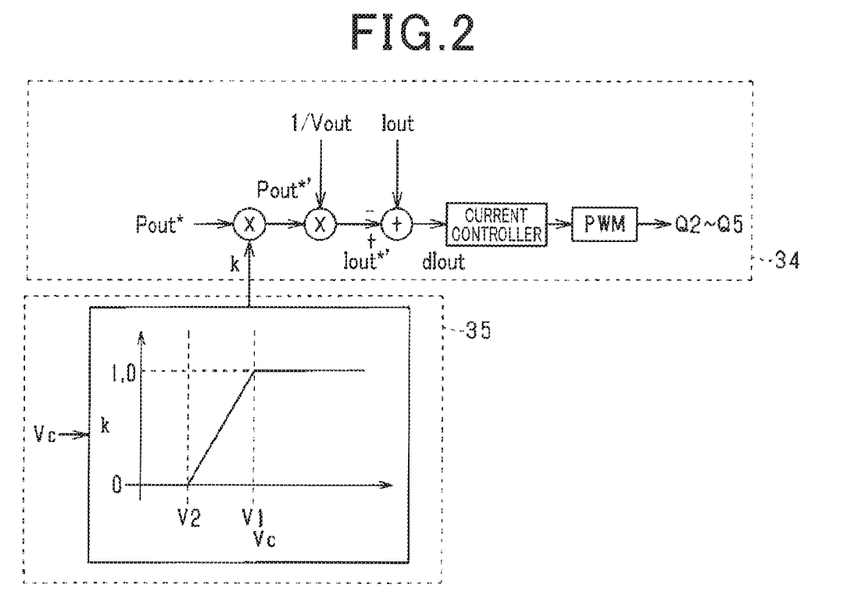
FIG. 2 is a control block diagram showing output power suppression control performed by a control unit of the power conversion apparatus according to the first embodiment of the invention.

FIG. 2 is a control block diagram showing the output power suppression control performed by the control unit 300 of the power conversion apparatus according to this embodiment.

The coefficient calculation section 35 calculates the coefficient k which is in the range between 0 and 1 based on the DC link voltage Vc, and sends the calculated coefficient k to the DC link voltage control section 34. The DC link voltage control section 34 obtains a compensated power command value Pout*' by multiplying the power command value Pout* by the coefficient k. Subsequently, the DC link voltage control section 34 obtains a compensated current command value Iout*' by dividing the compensated power command value Pout*' by the output voltage Vout, and then obtains an output current deviation dIout by subtracting the compensated current command value Iout* from the output current Iout. The output current deviation dIout thus obtained is supplied to a current controller to generate the PWM signal to be applied to the switching elements Q2 to Q5 as on/off signals.

Here, the coefficient k used for the output power suppression control is explained in detail. The coefficient k is set to 1 when the DC link voltage Vc is larger than or equal a first predetermined value V1. As the DC link voltage Vc decreases from the first predetermined value V1 to a second predetermined value V2, the coefficient k is decreased monotonically and linearly from 1 to 0. When the DC link voltage Vc is smaller than or equal to the second predetermined value V2, the coefficient k is set to 0. That is, when the DC link voltage Vc is smaller than or equal to the second predetermined value V2, the compensated power command value Pout*' is 0 so that the output power Pout of the DC-DC conversion circuit 200 takes the minimum value within its control range. The first predetermined value V1 is set to a value smaller than the value of the DC link voltage Vc when the AC power source 400 is in the normal state minus the peak value of the ripple voltage of the DC link voltage Vc. On the other hand, the second predetermined value V2 is set to a value larger than the predetermined stop voltage below which the control unit 300 stops the control of the DC-DC conversion circuit 200.

Figure 3:
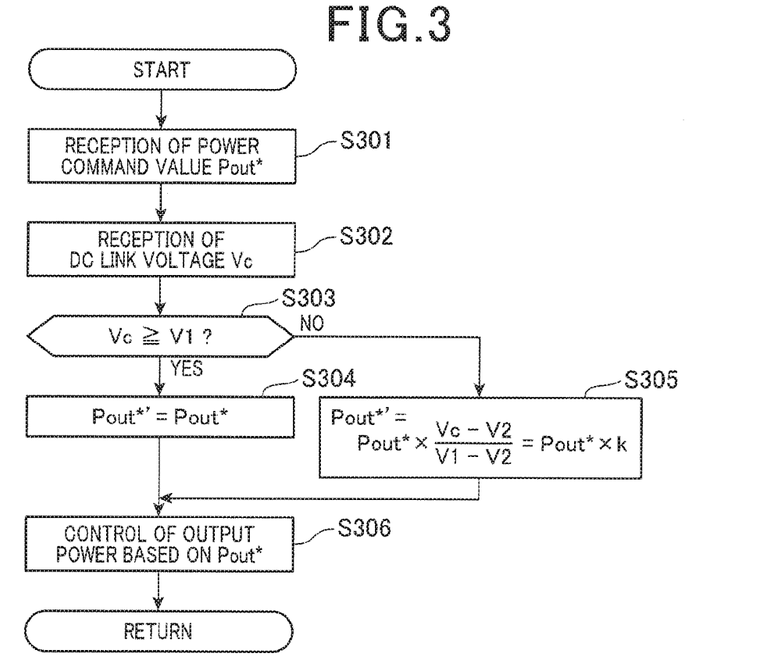
FIG. 3 is a flowchart showing steps of power conversion control performed by the control unit of the power conversion apparatus according to the first embodiment of the invention.

FIG. 3 is a flowchart showing steps of power conversion control performed at regular time intervals by the control unit 300 of the power conversion apparatus according to this embodiment. This control begins in step S301 where the power command value Pout* is received. As described in the foregoing, the power command value Pout* may be read from the memory within the control unit 300. In subsequent step S302, the detection value of the DC link voltage Vc is received, and then it is determined whether or not the DC link voltage Vc is larger than or equal to the first predetermined value V1 in step S303. If the determination result in step S303 is affirmative, since the coefficient k is 1, the compensated power command value Pout*' is set equal to the power command value Pout in step S304. If the determination result in step S303 is negative, since the coefficient k is set to a value smaller than 1 depending on the DC link voltage Vc, the compensated power command value Pout*' is set equal to the power command value Pout* multiplied by the coefficient k in step S305. As a result, the control of the output power Pout is performed in accordance with the compensated power command value Pout*' in step S306.

Figure 4:
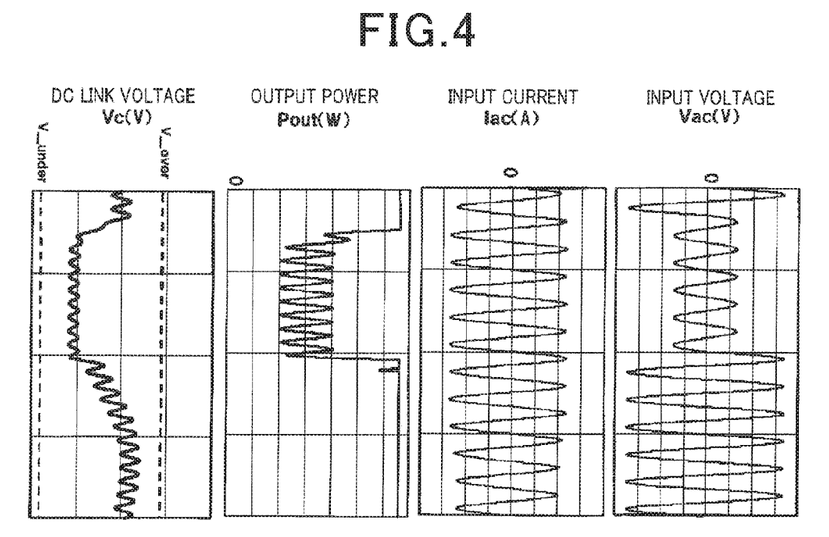
FIG. 4 is a graph showing an example of temporal variations of the DC link voltage, output power, input current and input voltage of the power conversion apparatus according to the first embodiment of the invention when the output power suppression control is performed.
Figure 5:
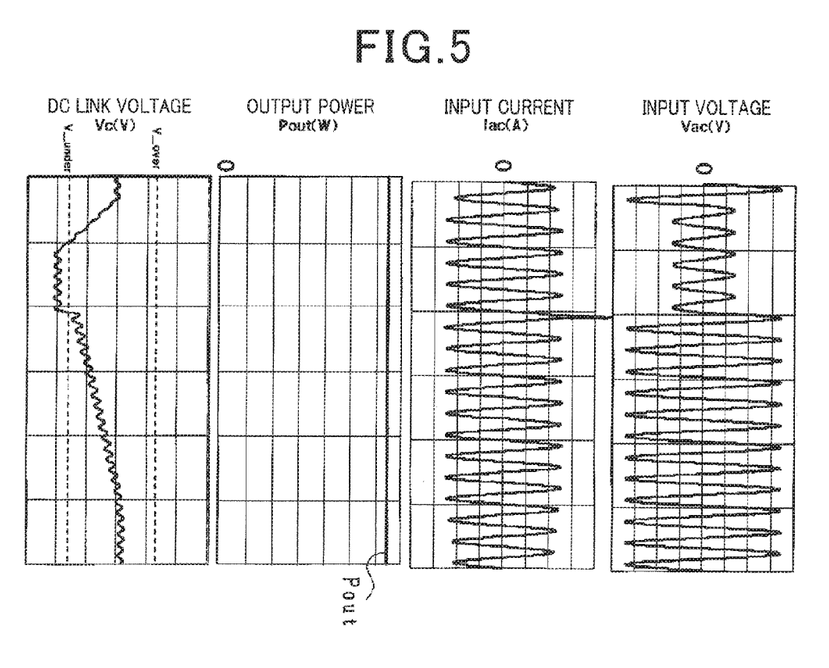
FIG. 5 is a graph showing an example of temporal variations of the DC link voltage, output power, input current and input voltage of the power conversion apparatus according to the first embodiment of the invention when the output power suppression control is not performed.

FIG. 4 shows an example of temporal variations of the input voltage Vac supplied from the AC power source 400, the input current Iac supplied from the AC power source 400, the output power Pout and the DC link voltage Vc in a case where the output power suppression control is performed when the voltage of the AC voltage 400 has dropped by 40%. FIG. 5 shows an example of temporal variations of the input voltage Vac, the input current Iac, the output power Pout and the DC link voltage Vc in a case where the output power suppression control is not performed when the voltage of the AC voltage 400 has dropped by 40%.

The DC link voltage Vc decreases with the decrease of the input voltage Vac. In the example of FIG. 4, since the output power suppression control is performed, the output power Pout is suppressed. Because of performing the control to suppress the output power Pout, the decrease of the DC link voltage Vc is also suppressed, and as a result, the DC link voltage Vc is prevented from falling below a lower limit value Vc_under and exceeding an upper limit value Vc_over. Here, the lower limit value Vc_under is a value which is smaller than the second predetermined value V2, and puts an inrush current caused due to the difference between the output voltage of the AC-DC conversion circuit 100 and the DC link voltage Vc within an allowable range when the input current Vac returns to its initial value. The upper limit value Vc_over is the withstand voltage of the smoothing capacitor 150.

In the example of FIG. 5, since the output power suppression control is not performed, the output power Pout is constant, and the DC link voltage Vc falls below the lower limit value Vc_under. Accordingly, when the input voltage Vac returns to its intial value, an inrush current Iac occurs due to the difference between the output voltage of the AC-DC conversion circuit 100 and the DC link voltage Vc.

Figure 6A:
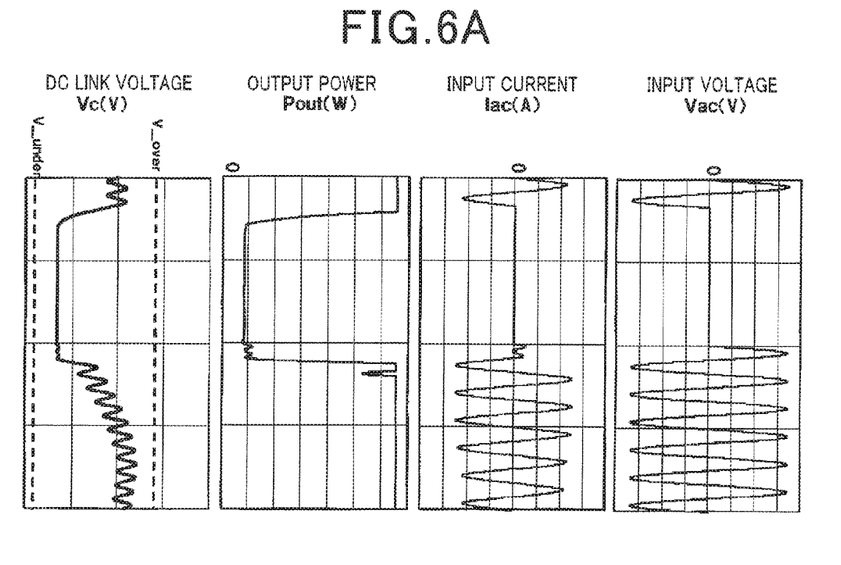
FIGS. 6A and 6B are graphs showing other examples of temporal variations of the DC link voltage, output power, input current and input voltage of the power conversion apparatus according to the first embodiment of the invention when the output power suppression control is performed.
Figure 6B:
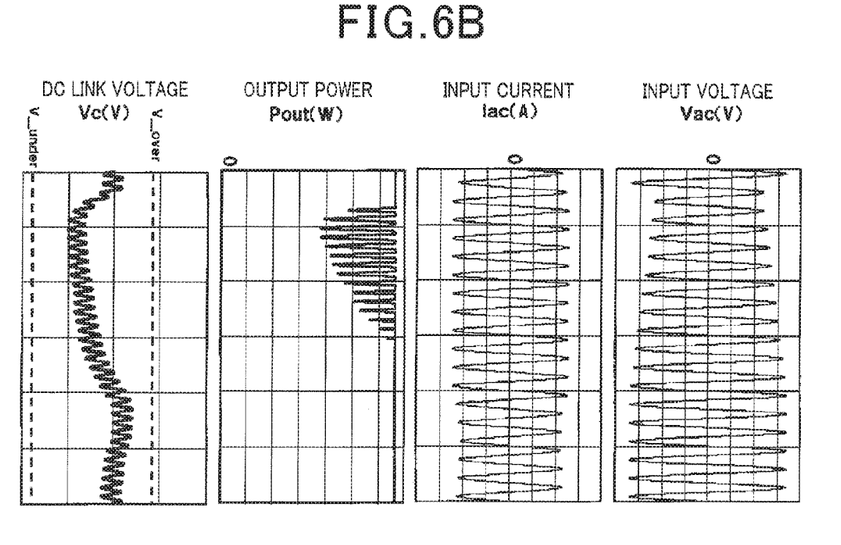

FIG. 6A shows an example of temporal variations of the input voltage Vac supplied from the AC power source 400, the input current Iac supplied from the AC power source 400, the output power Pout and the DC link voltage Vc in a case where the output power suppression control is performed when a power failure has occurred. FIG. 6B shows an example of temporal variations of the input voltage Vac supplied from the AC power source 400, the input current Iac supplied from the AC power source 400, the output power Pout and the DC link voltage Vc in a case where the output power suppression control is performed when a voltage variation has occurred.

In each of the examples of FIG. 6A and 6B, the DC link voltage Vc decreases with the decrease of the input voltage Vac. By performing the output suppression control, the output power Pout is suppressed link in the example of FIG. 4. As a result, the decrease of the DC link voltage Vc is suppressed, and the DC link voltage Vc is prevented from falling below the lower limit value Vc_under. The power conversion apparatus of this embodiment provides the following advantages.

When DC link voltage Vc is smaller than the first predetermined value V1, since the output power Pout of the DC-DC conversion circuit 200 is suppressed in accordance with the value of the DC link voltage Vc, the DC link voltage Vc can be suppressed from decreasing excessively. At this time, since measurement of the voltage variation is performed for the DC link voltage Vc which is a DC voltage, it is possible to detect the voltage variation of the AC voltage source 400 rapidly compared to when measurement of the voltage variation is performed directly for the output voltage of the AC voltage source 400. It is also possible to perform the control without measuring or using a voltage value or a current value of any point which is more to the side of the AC power source 400 than the smoothing capacitor 150 is. Accordingly, in a case where the AC-DC conversion circuit 100 and the DC-DC conversion circuit 200 are mounted on different apparatuses, it is possible to complete the control of the DC link voltage Vc on the side of the apparatus on which the DC-DC conversion circuit 200 is mounted. Therefore, the speed or responsiveness of the control to suppress the decrease of the DC link voltage Vc can be increased to thereby increase the robustness of the power conversion apparatus.

If the first predetermined voltage V1 is determined without respect to the ripple voltage, there may occur a case where the DC link voltage Vc falls below the first predetermined value V1 due to the ripple voltage even when the AC power source is in the normal state. In this case, since the control to suppress the output power of the DC-DC conversion circuit 200 is performed although the AC power source 400 is operating normally, the efficiency of power supply by the DC-DC conversion circuit 200 is lowered. According to the configuration described above, when the AC power source 400 is operating normally, the control to suppress the output power of the DC-DC conversion circuit 200 is not performed regardless of the ripple voltage, and so the efficiency of power supply by the DC-DC conversion circuit 200 can be prevented from being lowered.

If the second predetermined value V2 is smaller than the predetermined stop voltage, it may occur that the DC link voltage Vc falls below the stop voltage even when the control to suppress the output power Pout is performed, causing the power conversion apparatus to stop operation by its low-voltage protection function. By setting the second predetermined value V2 larger than the predetermined stop voltage, the DC link voltage Vc can be prevented from falling below the predetermined stop voltage due to performing the control to suppress the output power Pout, to thereby prevent the power conversion apparatus from stopping operation due to performing the control to suppress the output power Pout.

Since the coefficient k is changed continuously, the compensated power command value Pout*' can be changed continuously. As a result, when the DC link voltage Vc increases, the compensated power command value Pout*' increases, while when the DC link voltage Vc decreases, the compensated power command value Pout*' decreases. This makes it possible to cause the DC link voltage Vc to converge to a value corresponding to the compensated power command value Pout*' and prevent the DC link voltage Vc from oscillating.

Second Embodiment

Figure 7:
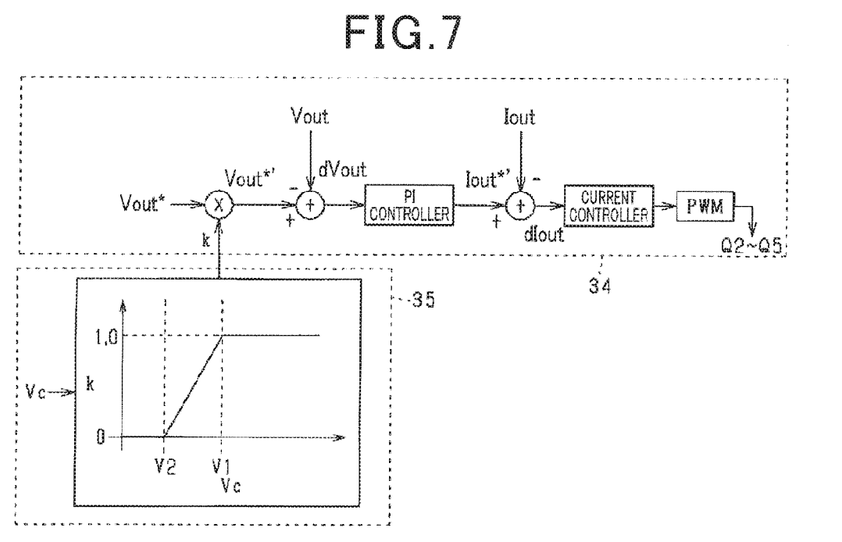
FIG. 7 is a control block diagram showing output power suppression control performed by a power conversion apparatus according to a second embodiment of the invention.

Next, a second embodiment of the invention is described. The power conversion apparatus according to the second embodiment differs from power conversion apparatus according to the first embodiment in the control performed by the DC link voltage control section 34. In the second embodiment, instead of the power command value Pout*, a voltage command value Vout* as a value to command the output voltage Vout of the DC-DC conversion circuit 200 is written in or read from the memory provided in the control unit 300.

FIG. 7 is a control block diagram showing the output power suppression control performed by the control unit 300 of the power conversion apparatus according to the second embodiment.

The coefficient calculation section 35 calculates the coefficient k which is in the range between 0 and 1 based on the DC link voltage Vc, and sends the calculated coefficient k to the DC link voltage control section 34. The DC link voltage control section 34 obtains a compensated voltage command value Vout*' by multiplying the voltage command value Vout* by the coefficient k. Subsequently, the DC link voltage control section 34 obtains a voltage deviation dVout by subtracting the compensated voltage command value Vout*' from the output voltage Vout. Thereafter, a compensated current command value Iout*' is obtained by inputting the obtained voltage deviation dVout to a PI controller, and then an output current deviation dIout is obtained by subtracting the compensated current command value Iout*' from the output current Iout. The output current deviation dIout thus obtained is supplied to a current controller to generate the PWM signal to be applied to the switching elements Q2 to Q5 as on/off signals.

The power conversion apparatus according to the second embodiment provides advantages similar to those provided by the power conversion apparatus according to the first embodiment.

Third Embodiment

Figure 8:
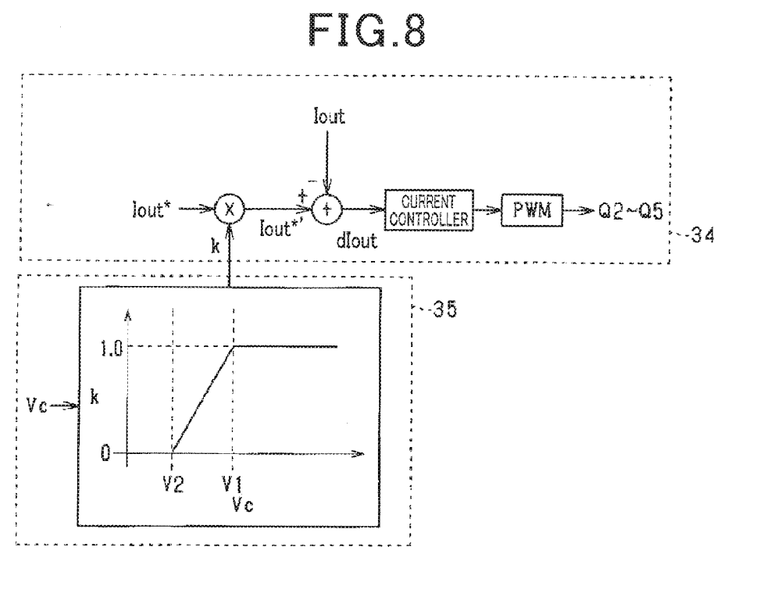
FIG. 8 is a control block diagram showing output power suppression control performed by a power conversion apparatus according to a third embodiment of the invention.

Next, a third embodiment of the invention is described. The power conversion apparatus according to the third embodiment differs from power conversion apparatus according to the first embodiment in the control performed by the DC link voltage control section 34. In the third embodiment, instead of the power command value Pout*, a current command value Iout* as a value to command the output current Iout of the DC-DC conversion circuit 200 is written in or read from the memory provided in the control unit 300.

FIG. 8 is a control block diagram showing the output power suppression control performed by the control unit 300 of the power conversion apparatus according to the third embodiment.

The coefficient calculation section 35 calculates the coefficient k which is in the range between 0 and 1, and sends the calculated coefficient k to the DC link voltage control section 34. The DC link voltage control section 34 obtains the compensated current command value Iout*' by multiplying the current command value Iout* by the coefficient k. Subsequently, the DC link voltage control section 34 obtains the current deviation dIout by subtracting the compensated current command value Iout*' from the output current Iout. The output current deviation dIout thus obtained is supplied to a current controller to generate the PWM signal to be applied to the switching elements Q2 to Q5 as on/off signals.

In this embodiment, since the control unit 300 can operate without using the output voltage Vout, the first voltage detector 31 may be omitted.

The power conversion apparatus according to the third embodiment provides advantages similar to those provided by the power conversion apparatus according to the first embodiment.

Fourth Embodiment

Next, a fourth embodiment of the invention is described. The power conversion apparatus according to the fourth embodiment differs from the power conversion apparatuses according to the above embodiments in the process for obtaining the coefficient k by the coefficient calculation section 35.

Figure 9:
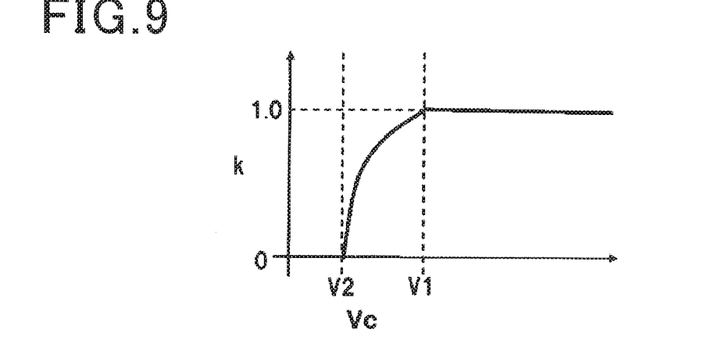
FIG. 9 is a graph which a power conversion apparatus according to a fourth embodiment of the invention uses to determine a coefficient k for output power suppression control based on the DC link voltage Vc.

FIG. 9 is a graph showing a relationship between the DC link voltage Vc and the coefficient k, which the coefficient calculation section 35 of this embodiment uses to calculate the coefficient k.

When the DC link voltage Vc is larger than the first predetermined value V1, the coefficient k is set to 1. As the DC link voltage Vc decreases from the first predetermined value V1 to the second predetermined value V2, the coefficient k is decreased from 1 to 0 exponentially, or quadratic or larger order-functionally. That is, the decrease rate of the coefficient k increases with the increase of the DC link voltage Vc. The coefficient k is set to 0 when the DC link voltage Vc is smaller than the second predetermined value V2.

The power conversion apparatus according to the fourth embodiment provides advantages similar to those provided by the power conversion apparatus according to the first embodiment.

Fourth Embodiment

Next, a fifth embodiment of the invention is described. The power conversion apparatus according to the fifth embodiment differs from the power conversion apparatuses according to the above embodiments in the process for obtaining the coefficient k by the coefficient calculation section 35.

Figure 10:
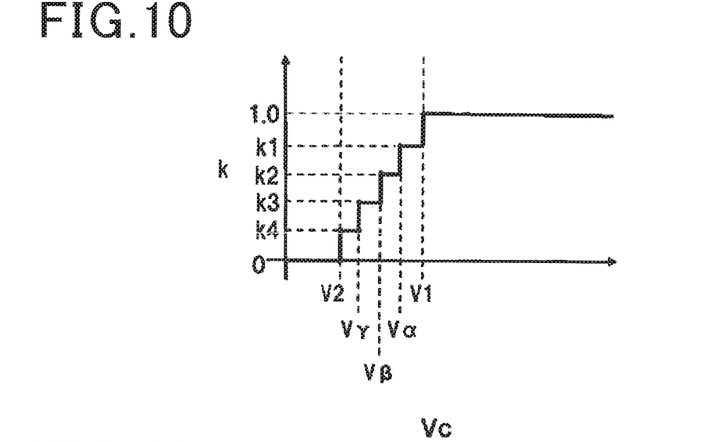
FIG. 10 is a graph which a power conversion apparatus according to a fifth embodiment of the invention uses to determine a coefficient k for output power suppression control based on the DC link voltage Vc.

FIG. 10 is a graph showing a relationship between the DC link voltage Vc and the coefficient k, which the coefficient calculation section 35 of this embodiment uses to calculate the coefficient k. In this embodiment, the coefficient k is changed stepwise with the increase of the DC link voltage Vc.

When the DC link voltage Vc is larger than the first predetermined value V1, the coefficient k is set to 1. When the DC link voltage Vc is smaller than or equal to the first predetermined value V1, and larger than a value Vα which is smaller than the first predetermined value V1 and larger than the second predetermined value V2, the coefficient k is set to k1 which is smaller than 1 and larger than 0. When the DC link voltage Vc is smaller than or equal to Vα and larger than a value Vβ which is smaller than Vα and larger than the second predetermined value V2, the coefficient k is set to k2 which is smaller than k1 and larger than 0. When the DC link voltage Vc is smaller than or equal to Vβ and larger than a value Vγ which is smaller than Vβ and larger than the second predetermined value V2, the coefficient k is set to k3 which is smaller than k2 and larger than 0. When the DC link voltage Vc is smaller than or equal to Vγ and larger than the second predetermined value V2, the coefficient k is set to k4 which is smaller than k3 and larger than 0. When the DC link voltage Vc is smaller than or equal to the second predetermined value V2, the coefficient k is set to 0.

Here, the coefficient k can be set in arbitrary number of steps between the first predetermined value V1 and the second predetermined value V2. These steps may be the same as one another or different from one another in step width of the coefficient k and step width of the DC link voltage Vc.

The power conversion apparatus according to the fifth embodiment provides the following advantages in addition to the same advantages as those provided by the power conversion apparatus according to the first embodiment.

To determine the coefficient k1 using a predetermined function, the processing load of the control unit 300 increases, because an arithmetic processing or a mapping process has to be carried out. In the power conversion apparatus according to the fifth embodiment, since such an arithmetic processing can be reduced and such a mapping process can be eliminated, the processing load of the control unit 300 and the capacity of the memory provided in the control unit 300 can be reduced.

Sixth Embodiment

Next, a sixth embodiment of the invention is described. The power conversion apparatus according to the sixth embodiment differs from the power conversion apparatuses according to the above embodiments in the process for obtaining the coefficient k by the coefficient calculation section 35.

Figure 11:
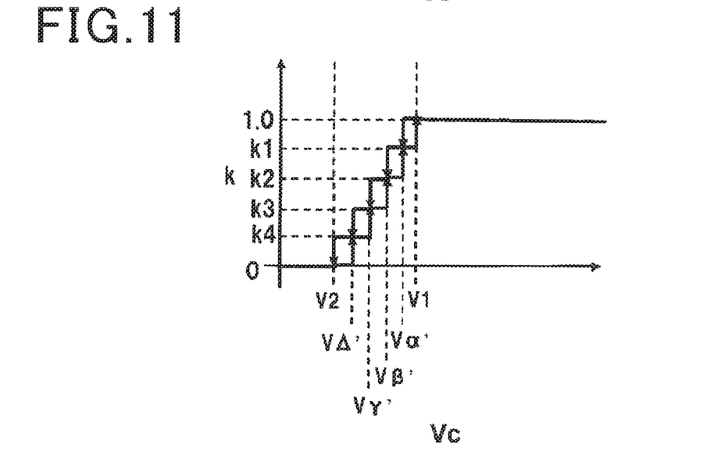
FIG. 11 is a graph which a power conversion apparatus according to a sixth embodiment of the invention uses to determine a coefficient k for output power suppression control based on the DC link voltage Vc.

FIG. 11 is a graph showing a relationship between the DC link voltage Vc and the coefficient k, which the coefficient calculation section 35 of this embodiment uses to calculate the coefficient k. In this embodiment, the coefficient k is changed stepwise with the increase of the DC link voltage Vc like in the fifth embodiment, and hysteresis is provided between when the coefficient k is reduced stepwise and when the coefficient k is increased stepwise.

When the DC link voltage Vc is larger than the first predetermined value V1, the coefficient k is set to 1. When the DC link voltage Vc decreases from the first predetermined value V1 to a value Vα' which is smaller than the first predetermined value V1 and larger than the second predetermined value V2, the coefficient k is set to 1. When the DC link voltage Vc decreases from Vα' to a value Vβ' which is smaller than Vα' and larger than the second predetermined value V2, the coefficient k is set to k1 which is smaller than k1 and larger than 0. When the DC link voltage Vc decreases from Vβ' to a value Vγ' which is smaller than Vβ' and larger than the second predetermined value V2, the coefficient k is set to k2 which is smaller than k1 and larger than 0. When the DC link voltage Vc decreases from Vγ' to a value VΔ' which is smaller than Vγ' and larger than the second predetermined value V2, the coefficient k is set to k3 which is smaller than k2 and larger than 0. When the DC link voltage Vc decreases from VΔ' to the second predetermined value V2, the coefficient k is set to k4 which is smaller than k3 and larger than 0. When the DC link voltage Vc falls below the second predetermined value V2, the coefficient k is set to 0.

On the other hand, when the DC link voltage Vc increases from the second predetermined value V2 to VΔ', the coefficient k is set to 0. When the DC link voltage Vc increases from VΔ' to Vγ', the coefficient k is set to k4. When the DC link voltage Vc increases from Vγ' to Vβ', the coefficient k is set to k3. When the DC link voltage Vc increases from Vβ' to Vα', the coefficient k is set to k2. When the DC link voltage Vc increases from Vα' to the first predetermined value V1, the coefficient k is set to k1. When the DC link voltage Vc exceeds the first predetermined value V1, the coefficient k is set to 1.

Here, the coefficient k can be set in arbitrary number of steps between the first predetermined value V1 and the second predetermined value V2 as in the fifth embodiment. These steps may be the same as one another or different from one another in step width of the coefficient k and step width of the DC link voltage Vc.

The power conversion apparatus according to the sixth embodiment provides the following advantages in addition to the same advantages as those provided by the power conversion apparatus according to the fifth embodiment.

When the coefficient k is increased or decreased, there is a concern that hunting of the coefficient k may occur in response to a slight change of the DC link voltage Vc, causing the output power Pout to vary. Since hysteresis is provided between when the coefficient k is reduced stepwise and when the coefficient k is increased stepwise, hunting of the coefficient k can be prevented to thereby prevent the output power Pout from varying.

Seventh Embodiment

Figure 12:
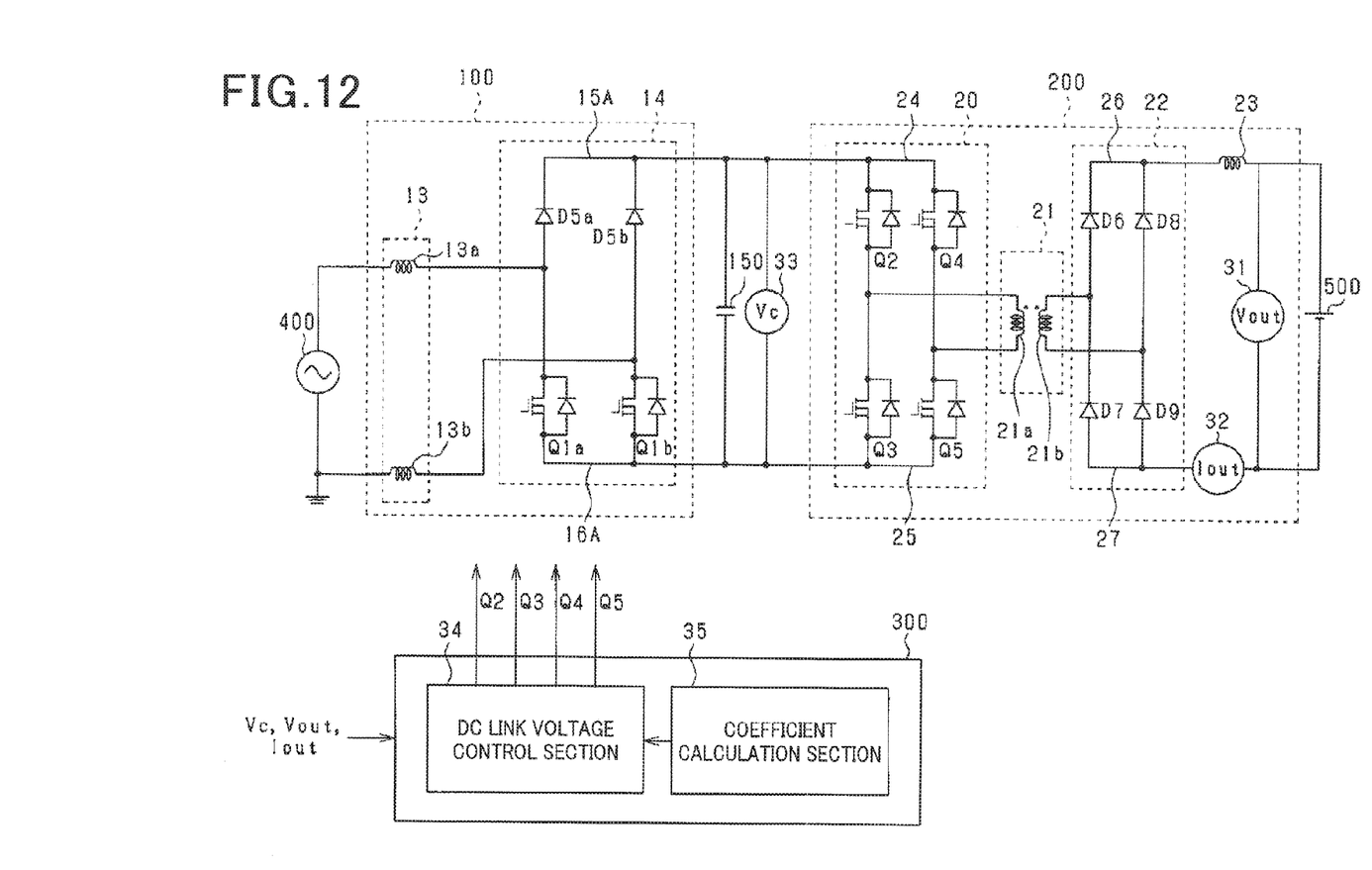
FIG. 12 is a circuit diagram of a power conversion apparatus according to a seventh embodiment of the invention.

Next, a seventh embodiment of the invention is described. FIG. 12 is a circuit diagram of a power conversion apparatus according to the seventh embodiment of the invention. The power conversion apparatus according to the seventh embodiment differs from the power conversion apparatus according to first embodiment in the structure of the AC-DC conversion circuit 100.

In this embodiment, the AC-DC conversion circuit 100 includes a smoothing reactor 13 constituted of a first reactor 13a and a second reactor 13b, and a bridge circuit 14. The AC source 400 is connected to the first reactor 13a and the second reactor 13b through the input end of the AC-DC conversion circuit 100.

The bridge circuit 14 includes a diode D5a, a diode D5b, and switching elements Q1a and Q1b each constituted of a MOSFET. Each of the diodes D5a and D5b is disposed in the upper arm on the high voltage side. Each of the switching elements Q1a and Q1b is disposed in the lower arm on the low voltage side. The diode D5a is connected to a high voltage side wire 15A at its cathode, and connected to the drain terminal of the switching element Q1a and the first reactor 13a at its anode. The diode D5b is connected to the high voltage side wire 15A at its cathode, and connected to the drain terminal of the switching element Q1b and the second reactor 13b at tis anode. The source terminals of the switching elements Q1a and Q1b are both connected to a low voltage side wire 16A. The high voltage side wire 15A and the low voltage side wire 16A are connected to the high voltage side output end and the low voltage side output end of the AC-DC conversion circuit 100, respectively.

In this embodiment, the control unit 300 performs control in the way similar to those performed in the above embodiments.

The power conversion apparatus according to the seventh embodiment provides advantages similar to those provided by the power conversion apparatus according to the first embodiment.

Modifications

In each of the above embodiments, the output end of the DC-DC conversion circuit 200 is connected with the rechargeable battery 500. However, the output end of the DC-DC conversion circuit 200 may be connected with a current consuming load other than a rechargeable battery. The structure of the AC-DC conversion circuit 100 is not limited to the one described in any of the above described embodiments. The AC-DC conversion circuit 100 may have any structure capable of converting received AC power to DC power to be supplied to the DC-DC conversion circuit 200.

The structure of the DC-DC conversion circuit 200 is not limited to the one described in any of the above described embodiments. The DC-DC conversion circuit 200 may have any structure capable of changing the level of the DC voltage supplied from the AC-DC conversion circuit 100.

The circuit elements used in the first and seventh embodiment are diodes or MOSFETs. However, IGBTs or bipolar transistors may be used as their circuit elements.

In the first and seventh embodiments, the AC power source 400 is a single phase power source. However, the AC power source 400 may be a three or more phase power source.

The above explained preferred embodiments are exemplary of the invention of the present application which is described solely by the claims appended below. It should be understood that modifications of the preferred embodiments may be made as would occur to one of skill in the art.

What is claimed is:

1. A power conversion apparatus comprising:
an AC-DC conversion circuit connected with an AC power source at an input end thereof for converting an AC power supplied from the AC power source to DC power;
a DC-DC conversion circuit connected with an output end of the AC-DC conversion circuit at an input end thereof for converting DC voltage level of the DC power generated by the AC-DC conversion circuit;
a smoothing capacitor parallel connected to the output end of the AC-DC conversion circuit and the input end of the DC-DC conversion circuit;
a DC link voltage detector for detecting a voltage of the smoothing capacitor as a DC link voltage; and
a control unit for controlling operation of the DC-DC conversion circuit,
wherein the control unit is configured to suppress output power of the DC-DC conversion circuit if the DC link voltage is smaller than a first predetermined value, and
the control unit suppress the output power of the DC-DC conversion circuit by multiplying a voltage command value as a value to command an output voltage of the DC-DC conversion circuit by a coefficient set in a range between 0 and 1 in accordance with the DC link voltage.

* * * * *